United States Patent
Van Trigt et al.

(10) Patent No.: US 7,933,481 B2
(45) Date of Patent: Apr. 26, 2011

(54) OPTICAL CABLE

(75) Inventors: Kees Van Trigt, Spijkenisse (NL);
Arnoldus Gertrudis Wilhelmus Berkers, Panningen (NL); Mijndert Doorn, Waddinxveen (NL); Erik Versteeg, Vleuten (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 12/354,801

(22) Filed: Jan. 16, 2009

(65) Prior Publication Data

US 2009/0190888 A1  Jul. 30, 2009

(30) Foreign Application Priority Data

Jan. 16, 2008  (NL) .................................. 1034923

(51) Int. Cl.
*G02B 6/44* (2006.01)
*G02B 6/02* (2006.01)

(52) U.S. Cl. ..................... 385/109; 385/113; 385/123
(58) Field of Classification Search .................. None
See application file for complete search history.

(56) References Cited

U.S. PATENT DOCUMENTS

| 5,369,720 | A | 11/1994 | Parry et al. |
| 5,408,561 | A | 4/1995 | McCallum, III et al. |
| 5,627,932 | A | 5/1997 | Kiel et al. |
| 5,740,295 | A | 4/1998 | Kinard et al. |
| 6,108,475 | A * | 8/2000 | Chapin et al. ............... 385/128 |
| 6,289,158 | B1 * | 9/2001 | Blyler et al. ............... 385/128 |
| 6,304,704 | B1 * | 10/2001 | Kalish et al. ............... 385/128 |
| 6,876,799 | B2 * | 4/2005 | Rossi et al. ................ 385/109 |
| 7,200,306 | B2 * | 4/2007 | Bourget .................... 385/103 |
| 2004/0240808 | A1 | 12/2004 | Rhoney et al. |
| 2006/0045453 | A1 * | 3/2006 | Park et al. ................. 385/128 |
| 2007/0217753 | A1 * | 9/2007 | Shirokura et al. ........... 385/124 |

FOREIGN PATENT DOCUMENTS

| EP | 0284900 A | 10/1988 |
| EP | 0296836 A | 12/1988 |
| EP | 1343041 A | 9/2003 |
| GB | 2215480 A | 9/1989 |

* cited by examiner

*Primary Examiner* — Tina M Wong
(74) *Attorney, Agent, or Firm* — Adams Law Group of Oliff Berridge

(57) ABSTRACT

The present invention relates to an optical cable comprising one or more optical waveguides, which one or more optical waveguides are provided with a protective layer, a buffer tube surrounding said one or more optical waveguides, which buffer tube is surrounded by an outer sheath, while a radial interspace is present between said outer sheath and said buffer tube, which radial interspace is filled with a filler.

19 Claims, 1 Drawing Sheet

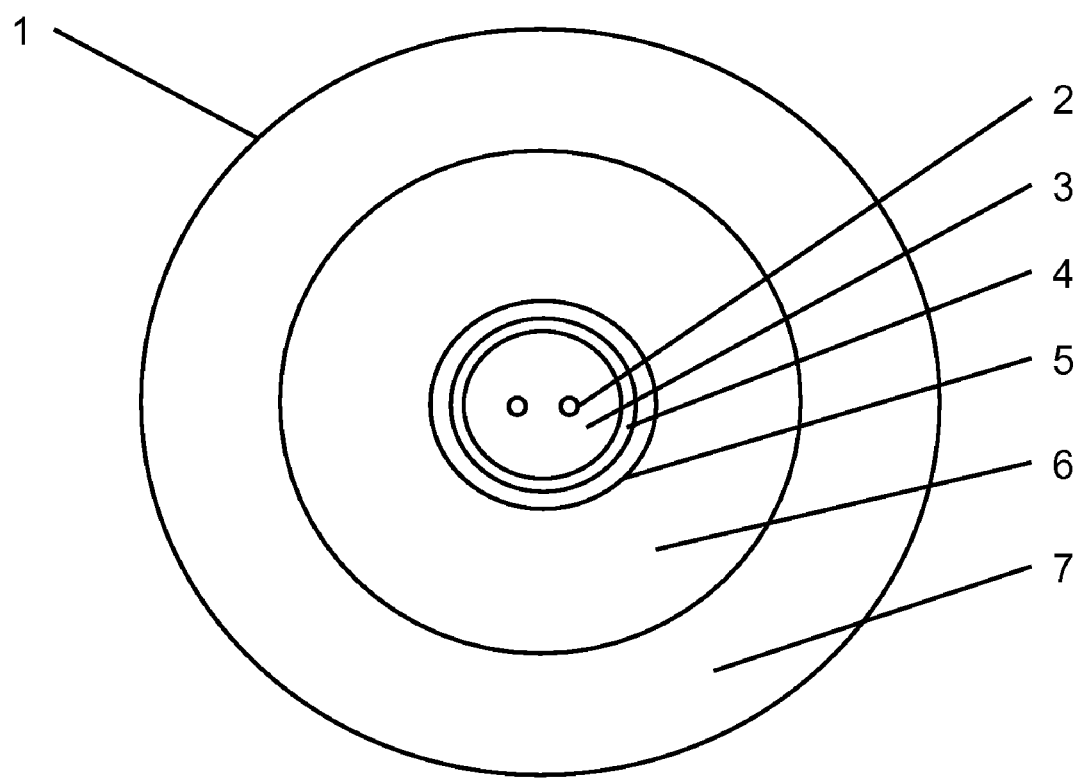

OPTICAL CABLE

BACKGROUND OF THE INVENTION

The present invention relates to an optical cable comprising one or more optical waveguides, wherein the one or more optical waveguides are provided with a protective layer, a buffer tube surrounding the one or more optical waveguides, wherein the buffer tube is surrounded by an outer sheath, and while a radial interspace is present between the outer sheath and the buffer tube, and wherein the radial interspace is filled with a filler.

Such a cable is known per se from British patent application GB 2 215 480, in which six buffer tubes are arranged around a central strengthening element, with the buffer tubes in turn being surrounded by an outer sheath. Each buffer tube contains six optical fibres, wherein the fibres are provided with a coating, and while the interspace between the coated optical fibres and the inner side of the buffer tube is filled with a filler. A thermoplastic polyester, in particular Hytrel, is used as a suitable material for the aforesaid buffer tube.

The present inventors are active in the field of so-called "direct buried drop cables", wherein these cables are placed underground for use in so-called "fibre to the home" (FTTH) networks, in which optical fibre cables are laid to homes. In a construction of this kind, optical fibres from different cables need to be connected together, with the weld housings usually being placed in the ground. The welding of optical fibres takes place aboveground, however, and some excess length of the optical fibres is needed for carrying out such welding operations. The optical fibre is frequently subject to mechanical loads, such as bending, during such operations. Said mechanical loads may cause the optical properties of the fibre to deteriorate.

BRIEF SUMMARY OF THE INVENTION

An object of the present invention is to develop an optical cable, which optical cable is suitable for use in underground applications, while furthermore minimizing the risk of irreversible damage being caused to the optical fibres, in particular when making interconnections between various glass fibre cables.

Another object of the present invention is to provide an optical cable which makes it possible to have low-skilled personnel carry out the installation thereof in FTTH applications and to make connections between optical fibres that do not adversely affect the optical performance of the optical fibre.

The optical cable as referred to in the introduction is characterized in that the one or more optical waveguides are encapsulated in a buffer layer in the buffer tube.

Additional features and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 1 is a schematic cross-section of an optical cable in accordance with an embodiment of the present invention.

DETAILED DESCRIPTION OF THE INVENTION

The present invention will now be described more fully hereinafter with reference to the accompanying drawing in which an exemplary embodiment of the invention is shown. However, the invention may be embodied in many different forms and should not be construed as limited to the representative embodiment set forth herein. The exemplary embodiment is provided so that this disclosure will be both thorough and complete, and will fully convey the scope of the invention and enable one of ordinary skill in the art to make, use and practice the invention.

One or more of the above objects are accomplished by using the aforesaid buffer layer, wherein the buffer layer fully encapsulates the one or more optical waveguides contained in the buffer tube.

To give such a buffer tube sufficient tensile strength, it is desirable that one or more strengthening elements are present in the free space of the buffer tube, which strengthening elements are in particular configured as a layer, which layer abuts against the inner side of the buffer tube. Examples of the aforesaid strengthening elements are aramid yarns, with an acrylate-type filler being used as the buffer layer. A suitable filler is a UV curable resin, like acrylate type resins. The filler should encapsulate the one or more optical waveguides completely. In addition, the filler should prevent the one or more optical waveguides of touching each other within the buffer tube. The buffer layer as such has an elastic function as well because a hard layer will cause microbending problems.

In one embodiment of the present invention, the distance between the outer diameter of the buffer layer and a circle directly surrounding the one or more optical waveguides should be at least 100 micrometers. In a situation of 2-4 optical waveguides, the minimal diameter of the buffer layer is about 0.8 mm, preferably about 0.9 mm. The buffer layer should be easily strippable from the one or more optical waveguides. This means that the buffer layer may not remain on the one or more optical waveguides after removing the buffer layer from the optical cable. The amount of optical waveguides is maximally six. In an embodiment with six optical waveguides, the outer diameter of the buffer tube is about 2.1 mm.

It should be noted that the buffer layer used herein should not be confused with the protective layer surrounding the waveguides, which protective layer may consist of two coatings, for example, which coatings are applied during the drawing process of the optical fibre. To obtain very good properties, it is desirable that the material of the buffer tube be made of polypropylene, with the bending radius of the buffer tube in particular being at least 15 mm. It has been found that by selecting a special polypropylene quality, a crush resistance of the buffer tube of at least 1250 N/10 cm can be obtained. An optical fibre is mentioned as an example of an optical waveguide.

Present in the radial interspace between the outer sheath and the buffer tube is an element which is capable of swelling under the influence of moisture, which element preferably abuts against the outer sheath. A water-swellable tape is a suitable element in this regard.

The filler present in the radial interspace is preferably a material which is capable of absorbing moisture, in which connection super-absorbent polymers may be considered. It has been found, however, that in specific embodiments a yarn may be used as the filler. In addition, the function of the filler is also to position and to maintain the buffer tube in the centre of the optical cable.

The minimal outer diameter of the outer sheath is at least 6 mm, preferably 7 mm. A suitable choice of material is polypropylene, as well polyamide 12. The thickness of the outer sheath is preferably at least 1 mm, preferably 1.5 mm.

The present invention will be explained in more detail below with reference to FIG. 1, in which the present optical cable is schematically indicated at 1. Two optical fibres 2, provided with one or more coatings (not shown), is fully encapsulated in a buffer layer 3. Said buffer layer 3 is in turn surrounded by a strengthening element, for example aramid yarns, configured as a layer 4. The aforesaid layer 4 of strengthening elements is directly surrounded by a buffer tube 5, which is preferably made of polypropylene. The construction of optical fibres 2, buffer layer 3, strengthening element layer 4 and buffer tube 5 is so configured that the buffer layer is fully surrounded by the strengthening element layer 4.

The outer side of the buffer tube 5 is encapsulated in a filler 6, which filler is fully surrounded by an outer sheath 7, which is preferably made of polypropylene. Although two optical fibres 2 are schematically shown in the aforesaid FIGURE, it should be understood that it is also possible to use a different number of optical fibres, in which regard in particular maximally four or six optical fibres 2 can be mentioned. Examples of suitable optical fibres can be found in Bend-insensitive Single-Mode Optical Fiber; Provisional U.S. Patent Application Ser. No. 61/112,374, European Patent applications 07006909.1, and 06076957.7, which documents are incorporated here as a reference. The outside diameter, including any coatings, is about 250 micrometer.

The external diameter of the optical cable 1 is about 7 mm, whilst the external diameter of the buffer tube 5 is about 1.8 mm and the thickness of the outer sheath 7 is about 1.5 mm. The optical cable 1 is manufactured by means of an extrusion process. The aforesaid construction of the buffer tube 5 and the components 2-4 present therein, in particular the selection of polypropylene and the strengthening elements 4, have made it possible to obtain a buffer tube 5 whose bending radius is at least 15 mm. The special selection of the thickness of the outer sheath 7 and of the polypropylene used for said outer sheath furthermore makes it possible to use the optical cable 1 in an underground construction, whilst bending of the buffer tube 5 will not lead to damage to the optical fibres 2 contained therein.

While the optical cable has been described with reference to specific embodiments and examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. An optical cable, consisting of in a radial direction a sequence of:
   a plurality of optical waveguides each coated with a protective coating;
   an elastic buffer layer encapsulating and physically separating the plurality of coated optical waveguides;
   a layer of strengthening elements circumferentially surrounding the elastic buffer layer;
   a single buffer tube circumferentially surrounding the layer of strengthening elements;
   wherein the buffer tube is surrounded by an outer sheath, and wherein a radial interspace is present between the outer sheath and the buffer tube, wherein the radial interspace is filled with a filler, and wherein the plurality of optical waveguides are encapsulated in the buffer layer in the buffer tube;
   wherein the optical cable includes only one buffer tube in total.

2. An optical cable according to claim 1, further comprising one or more strengthening elements present in free space of the buffer tube.

3. An optical cable according to claim 2, wherein the one or more strengthening elements are configured as a layer, and wherein the layer abuts against an inner side of the buffer tube.

4. An optical cable according to claim 1, wherein the bending radius of the buffer tube is at least 15 mm.

5. An optical cable according to claim 1, wherein the crush resistance of the buffer tube is at least 1250 N/10 cm.

6. An optical cable according to claim 1, further comprising a moisture swellable element in the radial interspace between the outer sheath and the buffer tube, wherein the moisture swellable element abuts against the outer sheath.

7. An optical cable according to claim 6, wherein the moisture swellable element is a water-swellable tape.

8. An optical cable according to claim 1, wherein the filler is a material capable of absorbing moisture.

9. An optical cable according to claim 1, wherein the number of optical waveguides is at least 2.

10. An optical cable according to claim 1, wherein the buffer tube is made of polypropylene.

11. An optical cable according to claim 1, wherein the outer sheath is made of polypropylene.

12. An optical box receiving at least a portion of the optical cable according to claim 1.

13. An optical fiber system to a subscriber's home (FTTH) comprising at least one portion of optical fiber according to claim 1.

14. An optical cable, consisting of in a radial direction a sequence of:
    a plurality of coated optical waveguides;
    an elastic buffer layer fully encapsulating and physically separating the plurality of coated optical waveguides;
    a layer of strengthening elements circumferentially surrounding the elastic buffer layer;
    a single buffer tube circumferentially surrounding the layer of strengthening elements;
    a water-swellable filler; and
    an outer sheath;
    wherein the optical cable includes only one buffer tube in total.

15. An optical cable according to claim 14, wherein a distance between an outer diameter of the buffer layer and a circle directly surrounding the plurality of optical waveguides is at least about 100 micrometers.

16. An optical cable according to claim 14, wherein the number of optical waveguides is from 2-4 and a minimal diameter of the buffer layer is about 0.8 mm.

17. An optical cable according to claim 14, wherein the number of optical waveguides is maximally 6.

18. An optical cable according to claim 14, wherein the number of optical waveguides is 6 and an outer diameter of the buffer tube is about 2.1 mm.

19. An optical cable according to claim 14, wherein a minimal outer diameter of the outer sheath is at least 6 mm.

* * * * *